(12) United States Patent
Meng

(10) Patent No.: US 12,038,674 B2
(45) Date of Patent: Jul. 16, 2024

(54) OPTICAL DEVICE WITH MAGNETIC MOUNTING AND DISMOUNTING MECHANISM, TOOL FOR MOUNTING AND DISMOUNTING THE SAME, AND OPTICAL DEVICE SET HAVING THE SAME

(71) Applicant: Tien-Pei Meng, Taipei (TW)

(72) Inventor: Tien-Pei Meng, Taipei (TW)

( * ) Notice: Subject to any disclaimer, the term of this patent is extended or adjusted under 35 U.S.C. 154(b) by 129 days.

(21) Appl. No.: 17/987,826

(22) Filed: Nov. 15, 2022

(65) Prior Publication Data

US 2023/0176450 A1 Jun. 8, 2023

(30) Foreign Application Priority Data

Nov. 18, 2021 (CN) .......................... 202111367679.4

(51) Int. Cl.
*G03B 17/14* (2021.01)
*G03B 11/00* (2021.01)

(52) U.S. Cl.
CPC .............. *G03B 17/14* (2013.01); *G03B 11/00* (2013.01)

(58) Field of Classification Search
CPC ........................... G03B 11/00–06; G03B 17/14
See application file for complete search history.

(56) References Cited

U.S. PATENT DOCUMENTS 10,393,988 B2 * 8/2019 Clark ..................... G03B 11/00
2020/0019043 A1 1/2020 Clark

FOREIGN PATENT DOCUMENTS

| CN | 107363773 A | * | 11/2017 | ............. B25B 13/48 |
|---|---|---|---|---|
| CN | 209387976 U | * | 9/2019 | |
| CN | 111443553 A | | 7/2020 | |
| JP | H16-2004264555 A | | 9/2004 | |
| TW | 202028845 A | | 8/2020 | |

* cited by examiner

*Primary Examiner* — Leon W Rhodes, Jr.
(74) *Attorney, Agent, or Firm* — CIPO IP Group

(57) ABSTRACT

An optical device with a magnetic mounting and dismounting mechanism and its mounting and dismounting tool can serve as an optical device set. At least a partial region of a frame of the optical device is made of a magnetically permeable material or a magnetic material. The front side of the frame has at least one first engaging portion. At least a partial region of the mounting and dismounting tool is made of a magnetic material, and one of its sides has at least one second engaging portion. The mounting and dismounting tool can magnetically attract and stick on the optical device to mount the optical device to a camera lens, functional lens or adapter ring, and/or dismount the optical device from the camera lens, functional lens or adapter ring.

23 Claims, 14 Drawing Sheets

OPTICAL DEVICE WITH MAGNETIC MOUNTING AND DISMOUNTING MECHANISM, TOOL FOR MOUNTING AND DISMOUNTING THE SAME, AND OPTICAL DEVICE SET HAVING THE SAME

CROSS-REFERENCE TO RELATED PATENT APPLICATION

This non-provisional application claims priority to and the benefit of, under 35 U.S.C. § 119(a), Chinese Patent Application No. 202111367679.4, filed Nov. 18, 2021 in People's Republic of China. The entire content of the above identified application is incorporated herein by reference.

FIELD

The present disclosure relates to an optical device, and more particularly to an optical device that can, when mounted on a camera lens, functional lens or adapter ring, be attracted magnetically to and stick on a mounting and dismounting tool and dismounted from the camera lens, functional lens or adapter ring.

BACKGROUND

With the rapid development of digital technology and optical technology, various digital products have not only improved constantly in terms of efficacy and performance, but also have gradually popularized as their prices decrease. Generally speaking, when shooting with a camera, in order to obtain different image effects, consumers usually attach filters with different effects (e.g., soft focus filters, star filters, polarizers, neutral-density filters, various color filters, etc.) on camera lenses. Or, in order to protect camera lenses or the aforementioned filters, a consumer would also attach a separate protective lens on a camera lens or filter. To hereby explain briefly, referring to FIGS. 1 and 2, an aforementioned filter or protective lens (hereinafter collectively referred to as "functional lens F") can be assembled to a front edge of a camera lens L, and can be mounted to a camera C with the camera lens L, so that when a consumer uses the camera C for photographing, images with special effects can be obtained, or the function of protecting the camera lens L can be achieved.

With the advancement of various image processing software, many of the above-referenced filters have gradually been replaced by powerful digital technology applications. However, polarizers, neutral-density filters and protective lenses are still very difficult to replace. As suggested by its name, a neutral-density filter is a filter that reduces the light transmission rate, and in general can be sorted into several different specifications according to the light transmission rate. According to the actual needs of shooting, a consumer can install single neutral-density filter or multiple neutral-density filters of different specifications on a lens, thereby appropriately reducing the amount of light passing through the lens, so as to photograph in an environment having a relatively stronger light source. A polarizer is a filter manufactured according to the polarization principle of light, and when the polarizer is rotated, the amount of light passing through a specific polarization angle can be adjusted. When a consumer installs a polarizer on a lens and adjust the angle of the polarizer appropriately, the reflection on the surface of an object (such as the surface of water, window glass or the surface of plant leaves) can be effectively eliminated, and ideal shooting effects can be obtained. A protective lens is used to protect the camera lens L, polarizer or neutral-density filter from being scratched by external dust (such as quartz sands) or damaged by impact.

However, the existing functional lens F (e.g., filters and protective lenses) is screwingly assembled onto the camera lens L after a user holds the frame of the functional lens F. Similarly, a consumer must also hold the frame of the functional lens F again to remove the functional lens F from the camera lens L. This kind of process requires the frame of the functional lens F to have a relatively greater thickness and be fully exposed so as to be sufficient for a consumer to hold and rotate. However, if the frame of the functional lens F is too thick, it will have a negative impact on the camera image (e.g., vignetting). Especially when consumers choose to photograph with wide-angle lenses or ultra-wide-angle lenses, the aforementioned defects are more likely to occur. Therefore, how to effectively solve the adverse effects caused by a frame that is too thick is one of the important issues addressed by the present disclosure.

SUMMARY

In view of the fact that there is still room for improvement in the existing functional lenses, in order to provide consumers with a better choice and use experience, as a result of long-term research, experimentation, development and design, the present disclosure provides an optical device with a magnetic mounting and dismounting mechanism, and its mounting and dismounting tool and optical device set, so that the aforementioned issues can be effectively addressed through the present disclosure.

Certain aspects of the present disclosure are directed to an optical device with a magnetic mounting and dismounting mechanism. The optical device includes a frame and at least one light-transmitting sheet. The frame has at least a partial region made of a magnetically permeable material or a magnetic material, and has an accommodating space penetrating through front and back. The outer wall of the frame is annularly provided with at least one external thread. The front side of the frame has at least one first engaging portion. The light-transmitting sheet can be mounted in the accommodating space to form the optical device. The frame can be screwed into the front side of a camera lens, a functional lens or an adapter ring through the external thread and expose each of the first engaging portion. The first engaging portion can be engaged with at least one second engaging portion of a mounting and dismounting tool so as to be driven by the mounting and dismounting tool to rotate and therefore be dismounted from the camera lens, functional lens or adapter ring, and the frame can be magnetically attracted to and stick on the mounting and dismounting tool. Accordingly, since the optical device can be embedded in the camera lens, functional lens or adapter ring, an negative impact by the frame to camera images can be effectively lowered or avoided.

Certain aspects of the present disclosure are directed to a mounting and dismounting tool with a magnetic mounting and dismounting mechanism. The mounting and dismounting tool is for mounting and dismounting the optical device, and it includes a magnetic member. The magnetic member has at least a partial region made of a magnetic material, and has at least one second engaging portion at a side thereof. The second engaging portion can be engaged with the at least one first engaging portion of the optical device to drive the optical device to rotate and therefore be mounted to the camera lens, functional lens or adapter ring, and/or to drive the optical device to rotate and therefore be dismounted from the camera lens, functional lens or adapter ring, and the magnetic member can magnetically attract and stick on the optical device. Accordingly, a user can conveniently mount or dismount the optical device through the magnetic attraction force of the mounting and dismounting tool.

Certain aspects of the present disclosure are directed to an optical device set with a magnetic loading and unloading mechanism. The optical device set includes an optical device and a mounting and dismounting tool. The optical device includes a frame and at least one light-transmitting sheet. The frame has at least a partial region made of a magnetically permeable material or a magnetic material, and has an accommodating space penetrating through front and back. The outer wall of the frame is annularly provided with at least one external thread, and a front side of the frame has at least one first engaging portion. The light-transmitting sheet can be mounted in the accommodating space to form the optical device. The mounting and dismounting tool includes a magnetic member. The magnetic member has at least a partial region made of a magnetic material, and has at least one second engaging portion at a side thereof. The second engaging portion can be engaged with at least one first engaging portion of the optical device to drive the optical device to rotate and accordingly be mounted to a camera lens, functional lens or adapter ring, and/or to drive the optical device to rotate and accordingly be dismounted from the camera lens, functional lens or adapter ring, and the mounting and dismounting tool can magnetically attract and stick on the frame. Accordingly, a user can swiftly mount the optical device to the camera lens, functional lens or adapter ring, or dismount the optical device from the camera lens, functional lens or adapter ring.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
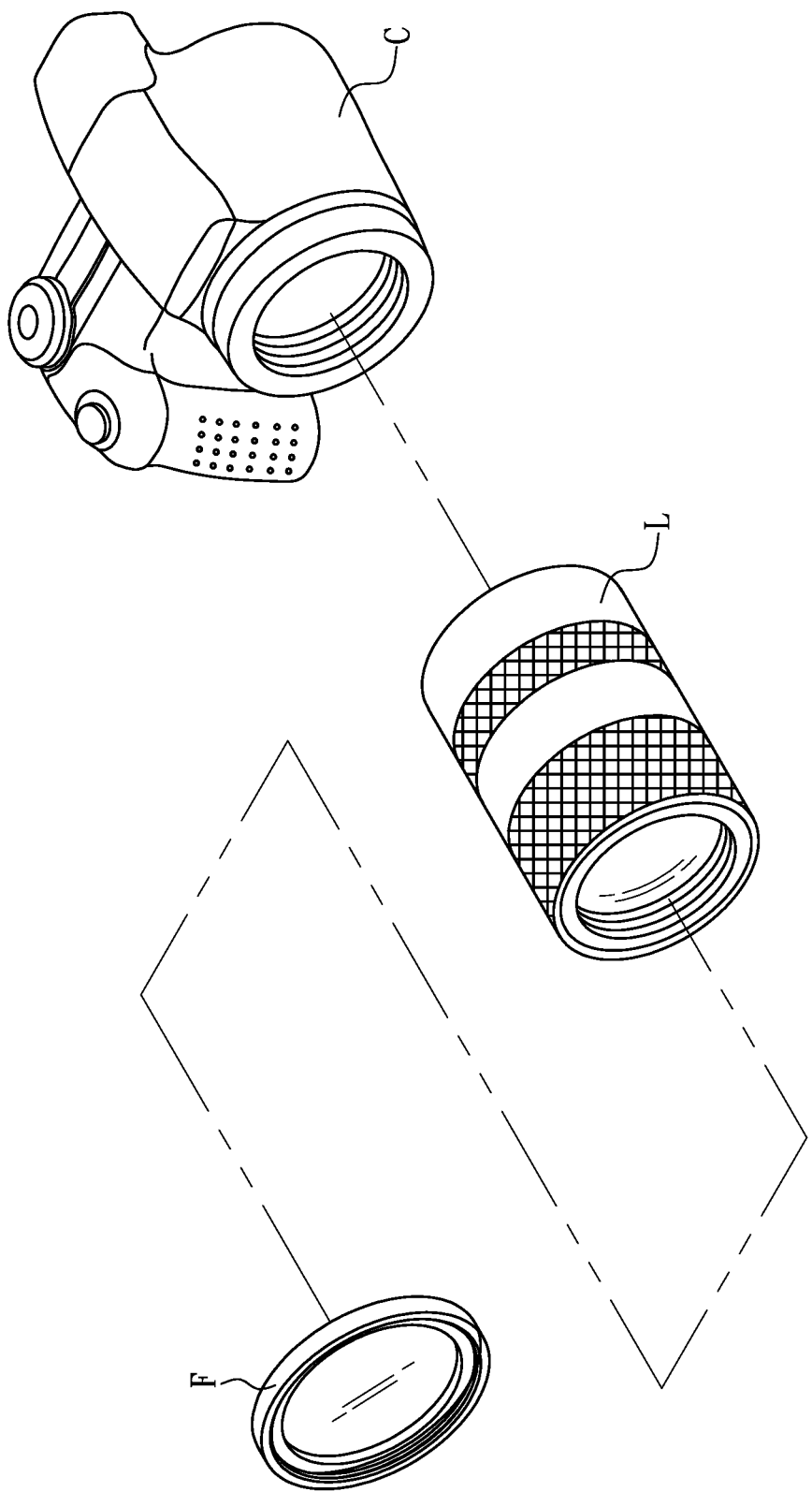
FIG. 1 is an exploded view of an existing functional lens, camera lens and camera.
Figure 2:
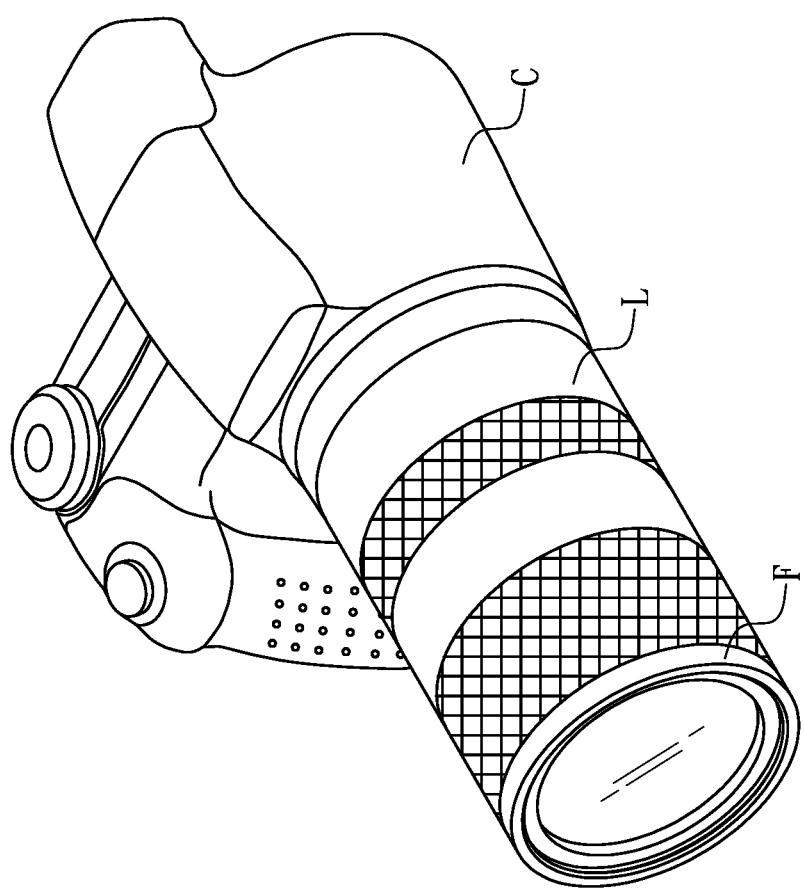
FIG. 2 is an assembled view of an existing functional lens, camera lens and camera.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

To address the issue of an existing functional lens having a frame with a relatively greater thickness, which in turn adversely affects camera images, the present disclosure provides a new optical device which can be used as a filter, functional lens or protective lens, and can, when mounted in a camera lens, another functional lens (e.g., a polarizer, neutral-density filter, etc.) or adapter ring, be embedded or substantially embedded in the camera lens, functional lens or adapter ring. Accordingly, issues derived from the frame having too great a thickness can be effectively addressed. Also, since the optical device is presented in an "embedded or substantially embedded" configuration, consumers cannot mount or dismount the optical device with their bare hands. Accordingly, the present disclosure also provides a mounting and dismounting tool with a magnetic mounting and dismounting mechanism and an optical device set to provide consumers with products that can be quickly mounted and dismounted. For ease of illustration, subsequent embodiments take the lower left side of FIG. 3 as the front positions of the components, and the upper right side of FIG. 3 as the rear positions of the components.

Figure 3:
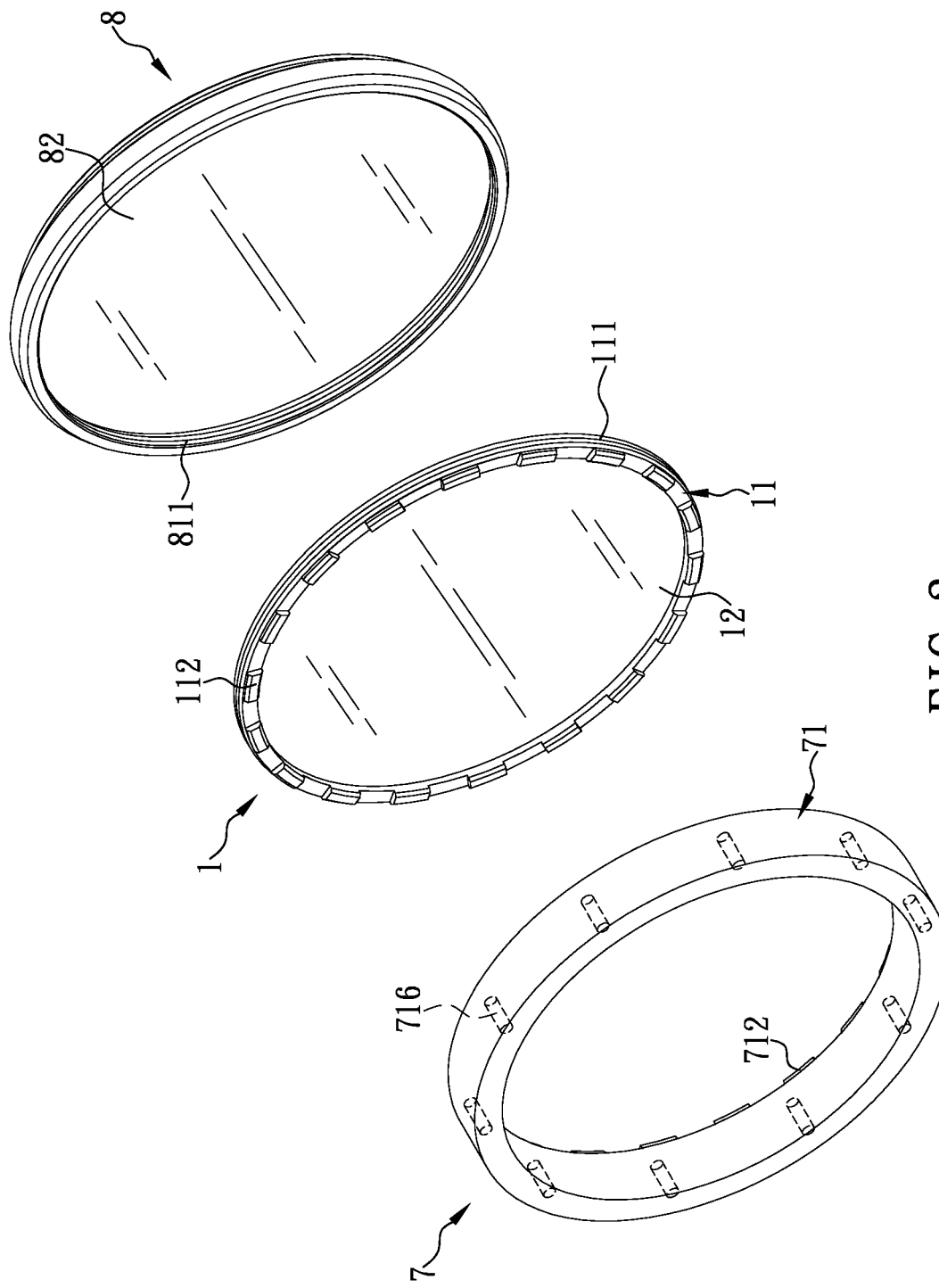
FIG. 3 is a front exploded view of an optical device set according to certain embodiments of the present disclosure.
Figure 4:
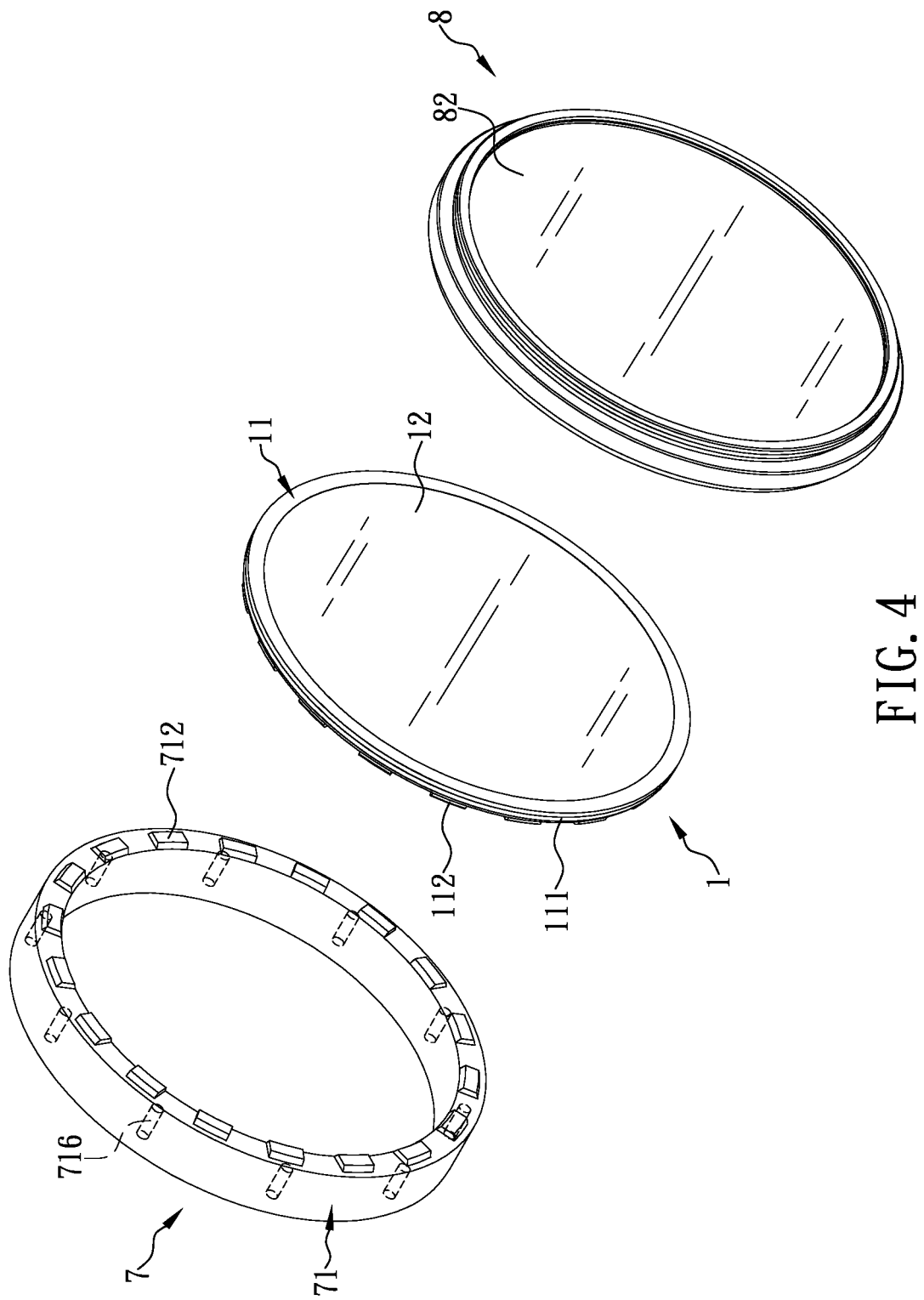
FIG. 4 is a rear exploded view of an optical device set according to certain embodiments of the present disclosure.
Figure 5:
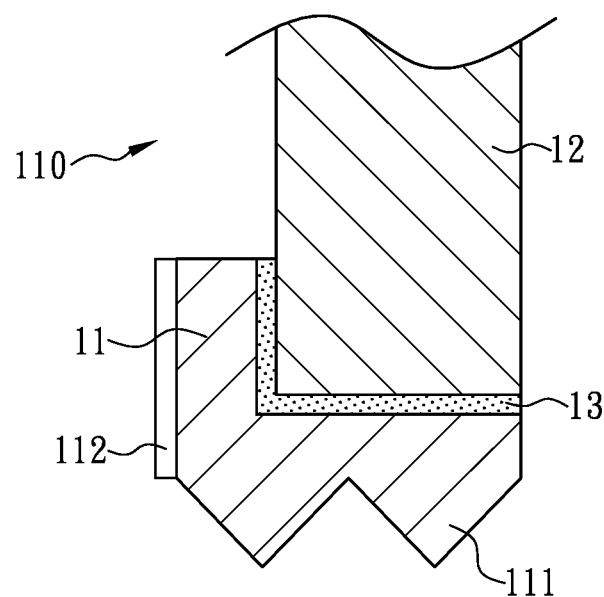
FIG. 5 is a cross-sectional view of an optical device according to certain embodiments of the present disclosure.

Referring to FIGS. 3 to 5, the optical device 1 includes a frame 11 and at least one light-transmitting sheet 12. The frame 11 has an accommodating space 110 penetrating through front and back, its outer wall is annularly provided with at least one external thread 111, and its front side has at least one first engaging portion 112. In certain embodiments, entire frame 11 is made of a magnetically permeable material (e.g., iron), and its front side is provided with a plurality of protrusions. The protrusions are separated from each other by an interval to respectively form each of the first engaging portion(s) 112. However, in other embodiments of the present disclosure, the form of the first engaging portion(s) 112 is not limited to protrusion(s), and its number, disposition position and structural form can be changed according to product requirements, for example, the first engaging portion 112 can be changed to a form of cavity.

Referring to FIGS. 3 and 5, the light-transmitting sheet 12 can be mounted in the accommodating space 110 to form the optical device 1. The light-transmitting sheet 12 can be made of glass, acrylic or other material that is sufficient to permit light transmittance, and can be coated or colored according to different uses of the optical device 1, such as being a protective lens, neutral-density filter, polarizer, etc., so as to change the light transmittance, color, hardness. UV resistance capacity or stain resistance capacity of the light-transmitting sheet 12, and even to adjust the number and structure of the light-transmitting sheet 12. For example, when the optical device 1 is used as a polarizer, the frame 11 can directly accommodate two light-transmitting sheets 12, and a polarizing film can be disposed between the two light-transmitting sheets 12; or, the frame 11 can indirectly accommodate two light-transmitting sheets 12, that is, the two light-transmitting sheet 12 can first be mounted into an inner frame, and then be mounted into the frame 11 together with the inner frame. As to how the aforementioned light-transmitting sheet(s) 12 is rotated, it will be described in subsequent embodiments.

Various assembling structures of the light-transmitting sheet(s) and the frame according to the present disclosure are hereby described in turn. In order to clarify the assembling characteristics of the light-transmitting sheet(s) and the frame, the light-transmitting sheet(s) and the frame are simplified in the subsequent embodiments, and only the necessary partial structures are illustrated. In certain embodiments, referring to FIG. 5, the cross-section of the frame 11 is L-shaped, and its front side is protrudingly provided with a first engaging portion 112. The inner side of the frame 11 can be disposed with an adhesive layer 13, and the light-transmitting sheet 12 can be placed into the accommodating place 110 from the rear side of the frame 11, and be fixed into the frame 11 through the adhesive layer 13 to form an entire optical device.

Figure 6A:
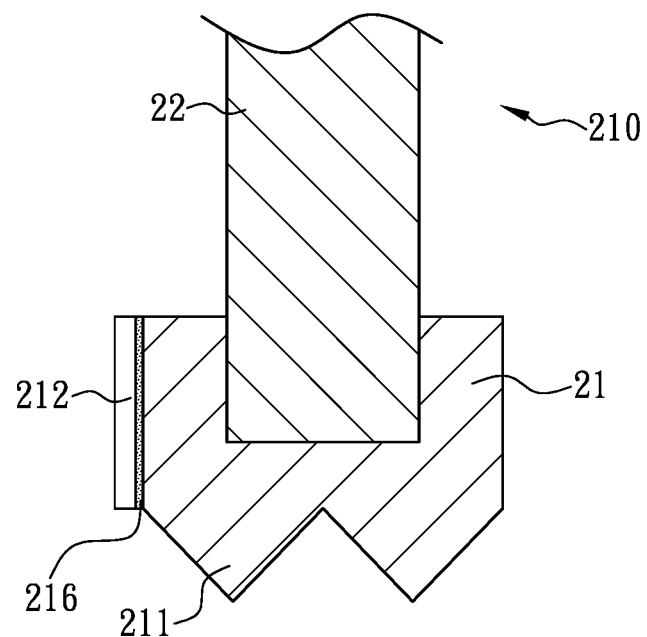
FIG. 6A is a cross-sectional view of an optical device according to certain embodiments of the present disclosure.
Figure 6B:
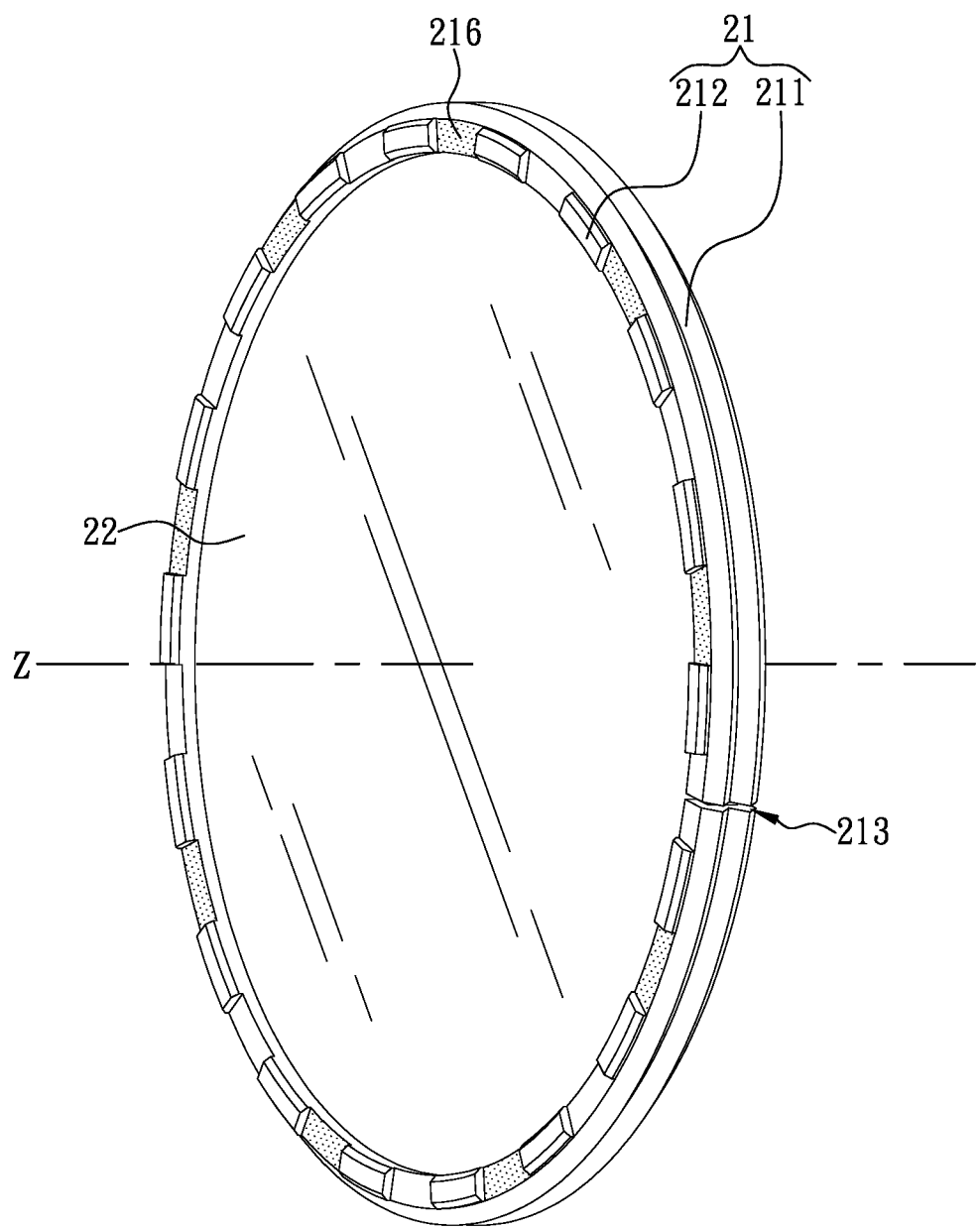
FIG. 6B is a prospective view of an optical device according to certain embodiments of the present disclosure.

In certain embodiments, referring to FIGS. 6A and 6B, the outer wall of a frame 21 is annularly provided with at least one external thread 211, the front side of the frame 21 has a first engaging portion 212, the frame 21 is formed with a breaching opening 213, the breaching opening 213 will penetrate through the inside and outside of the frame 21, so that the frame 21 can be opened up through the breaching opening 213, so a light-transmitting sheet 22 can be placed in an accommodating space 210 of the frame 21. Afterwards, the frame 21 clamps the light-transmitting sheet 22, and the breaching opening 213 can maintain sealed or maintain sealed as much as possible (i.e., the frame 21 does not clearly show the breaching opening 213) by welding, adhering or other fixing components (e.g., screw, bolt, etc.). In certain embodiments, the direction of the breaching opening 213 is formed along the direction of the central axis Z of the frame 21. In order to improve the overall stability of the optical device, so as to avoid the frame 21 from being separated through the aforementioned breaching opening 213 during long-term use, in other embodiments of the present disclosure, the breaching opening 213 of the frame 21 can be obliquely formed, that is, the direction of the breaching opening 213 will intersect with the central axis Z of the frame 21.

Figure 6C:
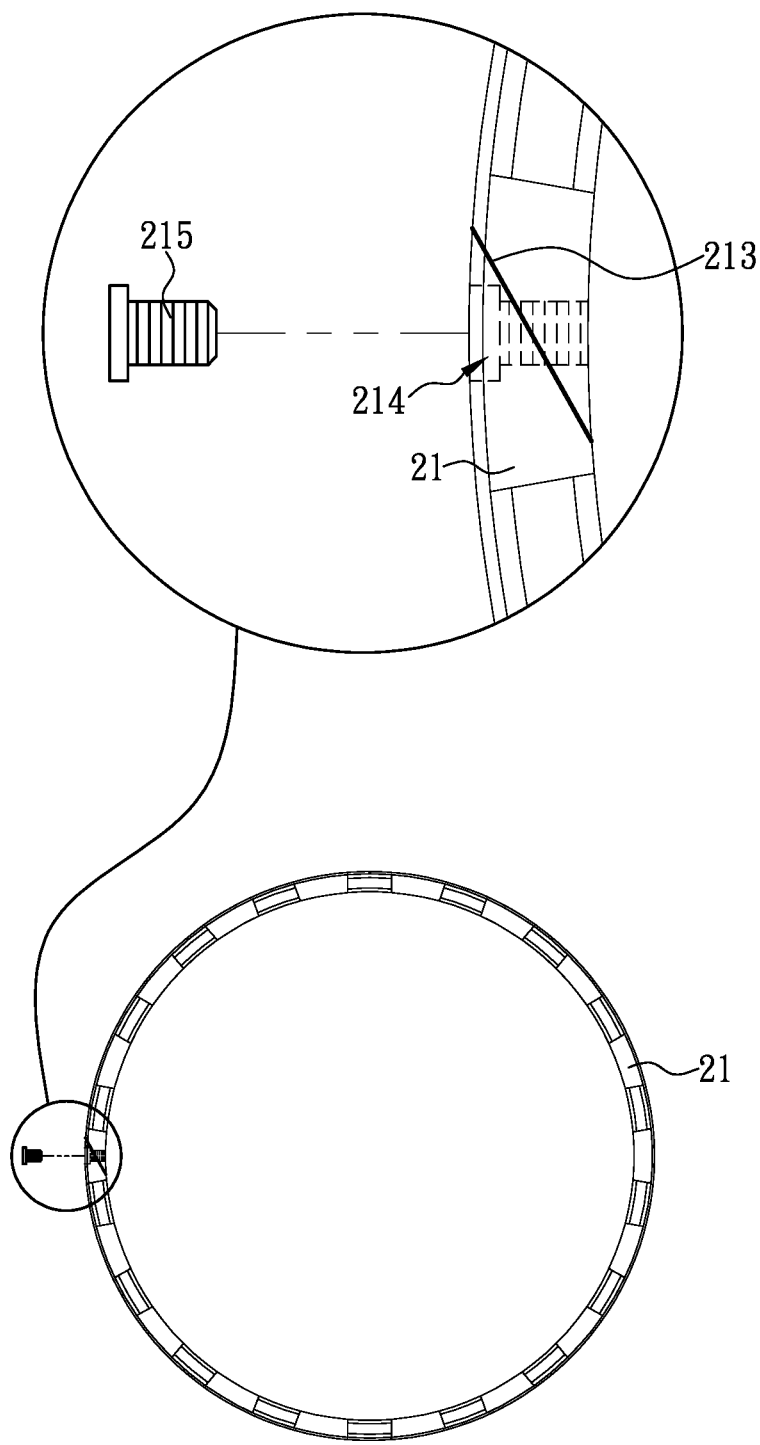
FIG. 6C is a schematic diagram of an optical device according to certain embodiments of the present disclosure.

Referring to FIG. 6C, in certain embodiments, a front view of the frame 21 shows the breaching opening 213 is obliquely formed, so that a position of the frame 21 that corresponds to the breaching opening 213 is divided into two ends adjacent to each other at the inside and also at the outside. A position of the frame 21 that corresponds to the breaching opening 213 can be concavely formed with a fixing groove 214 along the radial direction. The fixing groove 214 penetrates through the afore-referenced two ends, so that a fixing component 215 (e.g., a screw) can be extended and screwed into the fixing groove 214, causing the frame 21 to become an entirety and the breaching opening 213 to maintain sealed or sealed as much as possible.

Figure 6D:
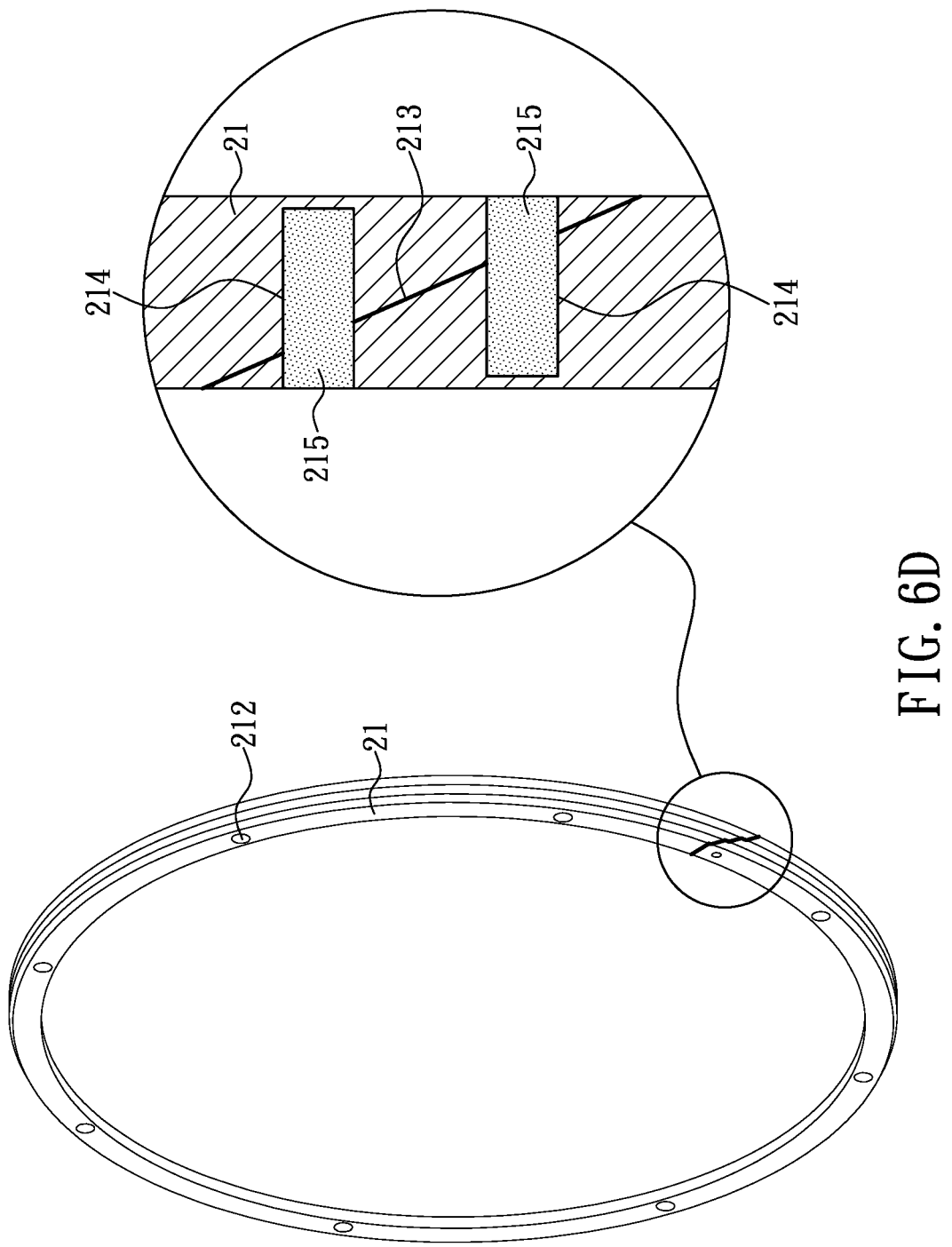
FIG. 6D is a schematic diagram of an optical device according to certain embodiments of the present disclosure.

Referring to FIG. 6D, in certain embodiments, a side view of the frame 21 shows the breaching opening 213 is obliquely formed, so that a position of the frame 21 that corresponds to the breaching opening 213 is divided into two ends adjacent to each other at the inside and also at the outside. A position of the frame 21 that corresponds to the breaching opening 213 can be concavely formed with a plurality of fixing grooves 214 along the axial direction. The fixing grooves 214 respectively penetrate through the afore-referenced two ends, so that a plurality of fixing components 215 (e.g., plastic strips) can be respectively extended into the fixing grooves 214. The fixing components 215 can be heated to melt and be fixed in the fixing grooves 214, causing the frame 21 to become an entirety and the breaching opening 213 to maintain sealed or sealed as much as possible. In certain embodiments, the frame 21 can be provided with a plurality of first engaging portions 212 along its circumference, and the first engaging portions 212 are in the configuration of cavities.

Although the embodiments above involve the process of breaking the frame 21 to create a breaching opening 213, so that the light-transmitting sheet 22 can be mounted into the frame 21, in certain embodiments, however, the present disclosure is not limited to the aforementioned process, and a practitioner may also directly use other tools or technical principles (e.g., thermal expansion and contraction) to temporarily expand the accommodating space of the frame 21 to facilitate the placing-in of the light-transmitting sheet 22.

Figure 7:
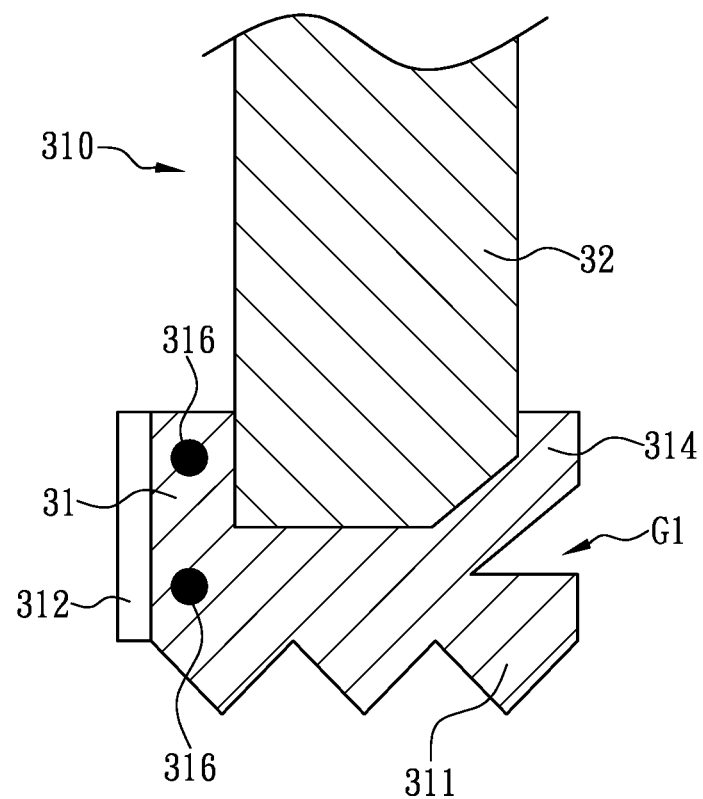
FIG. 7 is a cross-sectional view of an optical device according to certain embodiments of the present disclosure.

In certain embodiments, referring to FIG. 7, the outer wall of the frame 31 is annularly provided with at least one external thread 311, the front side of the frame 31 has a first engaging portion 312, and the inner side of the flame 31 has a clamping plate 314. Before the light-transmitting sheet 32 is mounted, the clamping plate 314 will abut against the inner side of the frame 31, so that the cross-sectional shape of the frame 31 is approximate to the cross-sectional shape of the frame 11 in FIG. 5, and the gap G1 does not appear. When the light-transmitting sheet 32 is placed in the accommodating space 310 of the frame 31, the clamping plate 314 can be forced to deform by a tool to clamp (or referred to as rivet together) the light-transmitting sheet 32 (as shown as the configuration in FIG. 7), so that the light-transmitting sheet 32 can be fixed to the frame 31. Further, in order to prevent the edge of the light-transmitting sheet 32 from damage caused by the compression by the clamping plate 314, a position of the light-transmitting sheet 32 that corresponds to the clamping plate 314 can be formed with an inclined surface, so that the clamping plate 314 can stably and fittingly abut against the light-transmitting sheet 32. In certain embodiments, the clamping plate 314 is located at a position adjacent to the rear side of the frame 31. However, limited not thereto, in other embodiments of the present disclosure, the clamping plate 314 also can be located at a position adjacent to the front side of the frame 31, or clamping plates 314 can be respectively provided at positions at the inner side of the frame 31 that are adjacent to the front and rear sides, and such clamping plates 314 can simultaneously clamp the light-transmitting sheet 32.

Figure 8:
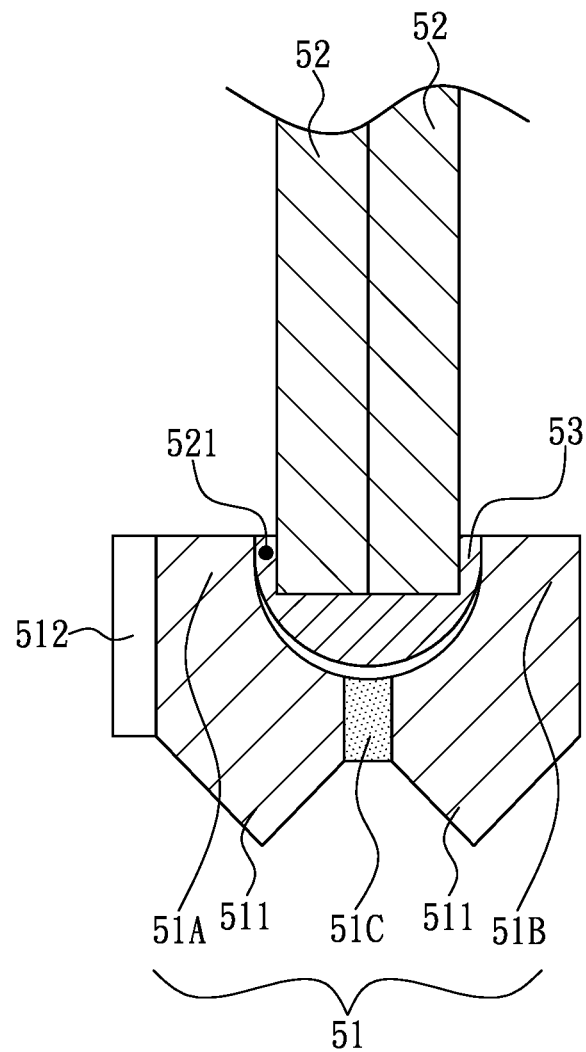
FIG. 8 is a cross-sectional view of an optical device according to certain embodiments of the present disclosure.

In certain embodiments, referring to FIG. 8, a frame 51 can include a plurality of frame units (e.g., two frame units 51A, 51B). The two frame units 51A, 51B constitute the front and rear sides of the frame 51, respectively. The outer walls of the two frame units 51A, 51B are respectively annularly provided with an external thread 511, and the front side of the frame unit 51A has a first engaging portion 512. When the two frame units 51A, 51B are assembled from the front and rear sides of the light-transmitting sheet 52, respectively, the two frame units 51A, 51B can be combined together by welding, adhering engagement, or other fixing components, so that the light-transmitting sheet 52 can be fixed in the frame 51 (i.e., the two frame units 51A, SIB). For example, in certain embodiments, a fixing method of the adhesive 51C is used. However, the present disclosure is not limited thereto. If the two frame units 51A. 51B adopts other fixing components or methods, then the two frame units 51A. 51B in FIG. 8 can be in direct contact, and there will be no adhesive 51C.

In certain embodiments, referring to FIG. 8, two light-transmitting sheets 52 are provided in the frame 52 with a polarizing film (not shown in the figure) being disposed between the two light-transmitting sheets 52, which can be mounted into an inner frame 53 in advance (equivalent to a polarizer structure). Subsequently, the inner frame 53 together with the two light-transmitting sheet 52 can be assembled into the frame 51. Further, a position of the inner frame 53 that is adjacent to the periphery of the inner frame 53 can have at least one magnetic driving portion 521. The magnetic driving portion 521 is made of a magnetically permeable material or a magnetic material. Accordingly, a consumer can approach the magnetic driving portion 521 with a magnet or the mounting and dismounting tool 7 to be referred to infra, so as to attract the magnetic driving portion 521 by a magnetic force. Subsequently, when a user moves the magnet (or the mounting and dismounting tool 7), the inner frame 53 can be driven simultaneously to rotate, further causing the two light-transmitting sheets 52 to rotate.

Further, although in certain embodiments the magnetic driving portion 521 is embedded in the inner frame 53, the present disclosure is not limited thereto. In certain embodiments of the present disclosure, the magnetic driving portion 521 can be located outside the inner frame 53, but located in the gap between the inner frame 53 and the frame 51 (i.e., corresponding to the inside of the frame 51). In certain embodiments, the inner frame 53 itself can be of a magnetically permeable material or a magnetic material, without needing the magnetic drive portion 521, and because the inner frame 53 and the frame 51 are pivoted to each other, the inner frame 53 can therefore be affected by the magnetic force and rotate in the frame 51. In certain embodiments, the inner frame 53 can be omitted, the two light-transmitting sheets 52 are directly pivoted at the frame 51, and the magnetic driving portion 521 can be disposed in, or at the outer surface of, a light-transmitting sheet 52. For example, the magnetic driving portion 621 in FIG. 9 is located on a light-transmitting sheet 62 and is exposed, and can be driven by a magnet (or the mounting and dismounting tool 7) to cause the light-transmitting sheet 62 to rotate together.

Figure 9:
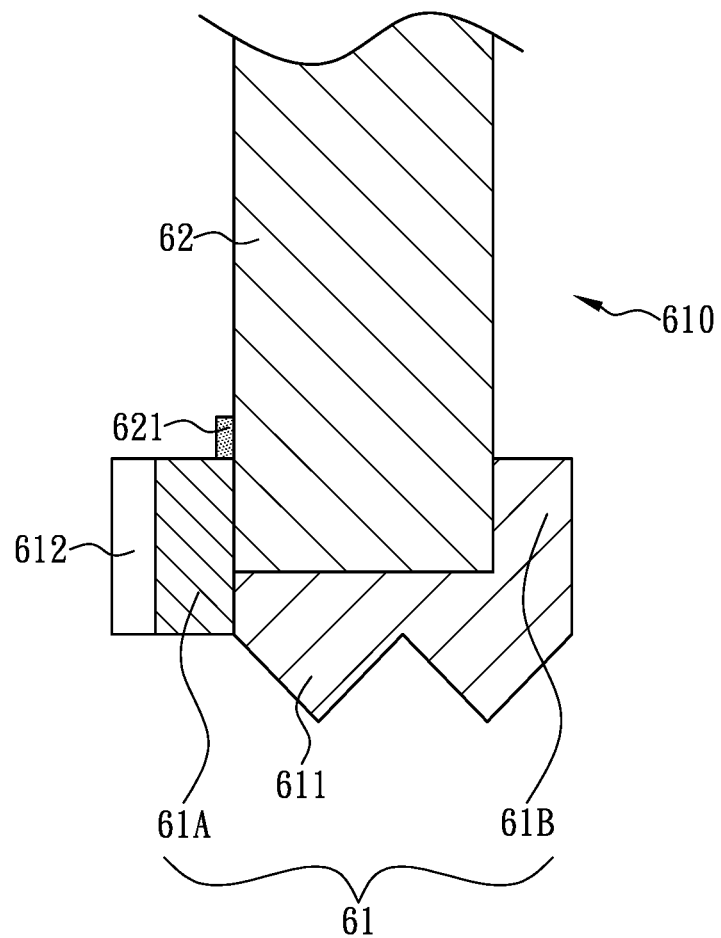
FIG. 9 is a cross-sectional view of an optical device according to certain embodiments of the present disclosure.

In certain embodiments, referring to FIG. 9, the frame 61 is composed of two frame units 61A, 61B, the front side of the frame unit 61A is provided with a first engaging portion 612, and its own outer wall is not annularly provided with an external thread. The cross-section of the frame unit 61B is approximately L-shaped, and its outer wall is annularly provided with an external thread 611. Further, the light-transmitting sheet 62 can first be placed in the accommodating space 610 of the frame unit 61B from the front to the back, and then the frame unit 61A will be assembled on the frame unit 61B to form an optical device. The assembling method of the two frame units 61A and 61B can be through welding, adhering, engagement or other fixing components.

In addition to the assembling structure between the light-transmitting sheet(s) and the frame, the structure with magnetic characteristics and required by the frame also has multiple embodiments, and is not limited to the frame 11, which is entirely made of a magnetically permeable material. In certain embodiments of the present disclosure, the frame can include a main body and an auxiliary body. The main body is made of a non-magnetically permeable material (e.g., aluminum), and the auxiliary body is made of a magnetically permeable material or a magnetic material. In other words, when the frame includes both a non-magnetically permeable material and a magnetically permeable material (or magnetic material), the frame can be distinguished into a main body and an auxiliary body, and the main body is not limited to a single component, but can also be composed of a plurality of components (e.g., two frame units 51A, 51B of the aforementioned embodiments). Accordingly, the part belonging to the non-magnetically permeable material can be the main body, and the part that belongs to the magnetic permeable material (or magnetic material) can be the auxiliary body.

Referring to FIGS. 6A and 6B, in certain embodiments, the frame 21 includes a main body and an auxiliary body 216, and the auxiliary body 216 can be disposed on the outer surface of the main body. Viewed from FIGS. 6A and 6B, the auxiliary body 216 can cover a position adjacent to a first engaging portion 212, and is exposed. However, in certain embodiments of the present disclosure, the auxiliary body 216 can also cover a first engaging portion 212, or be directly made as or into a first engaging portion 212. In certain embodiments, the auxiliary body 316 (e.g., iron bead(s) or magnetic bead(s)) can be embedded in the main body (as shown in FIG. 7).

Referring to FIGS. 3 and 4, a mounting and dismounting tool 7 is used to mount or dismount the optical device 1, which together with the optical device 1 can form the optical device set according to the present disclosure. It is particularly noted hereby that the form of the mounting and dismounting tool 7 is not limited to the appearance illustrated in FIG. 3, and as long as it has a structure described infra and is sufficient to mount or dismount the optical device according to the present disclosure, it is the mounting and dismounting tool referred to in the present disclosure.

Figure 10:
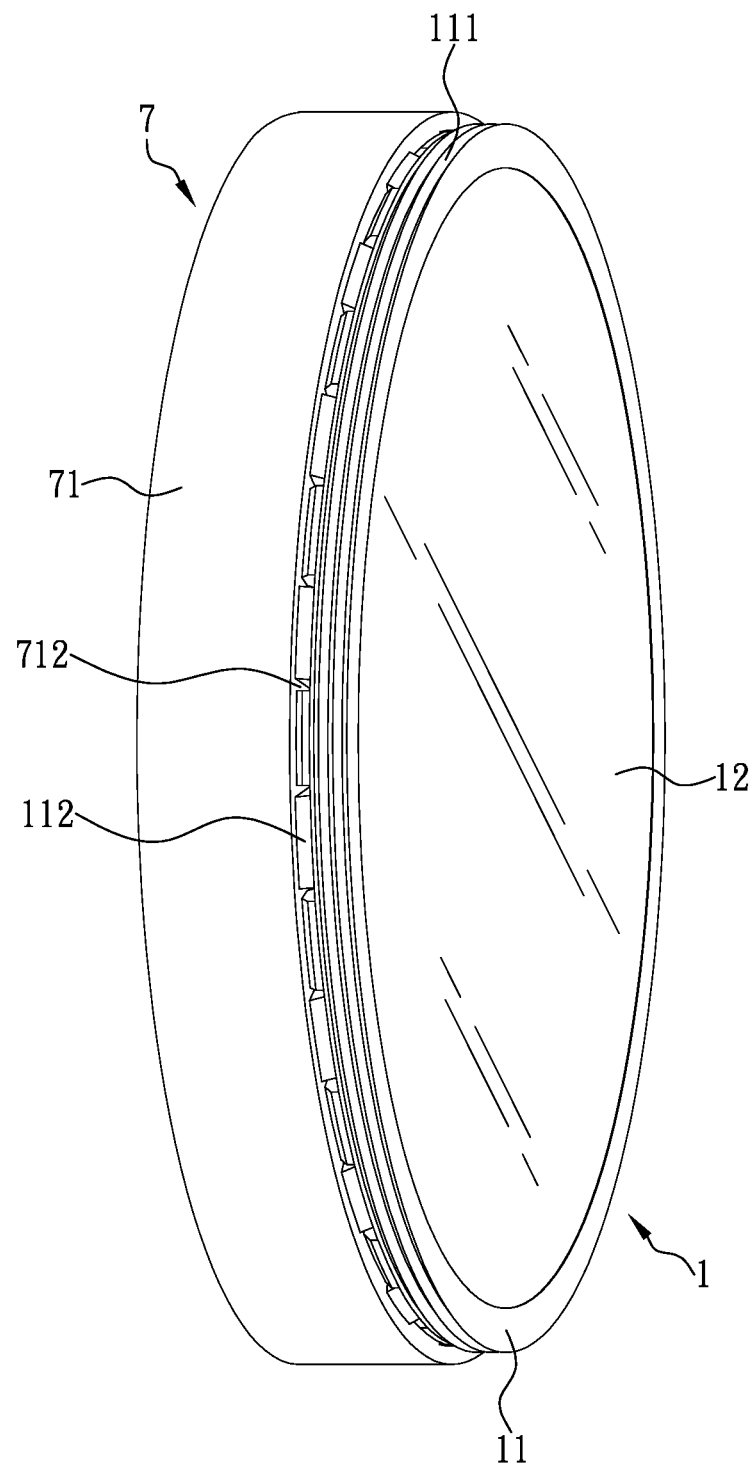
FIG. 10 is an assembled view of an optical device and a mounting and dismounting tool according to certain embodiments of the present disclosure.
Figure 11:
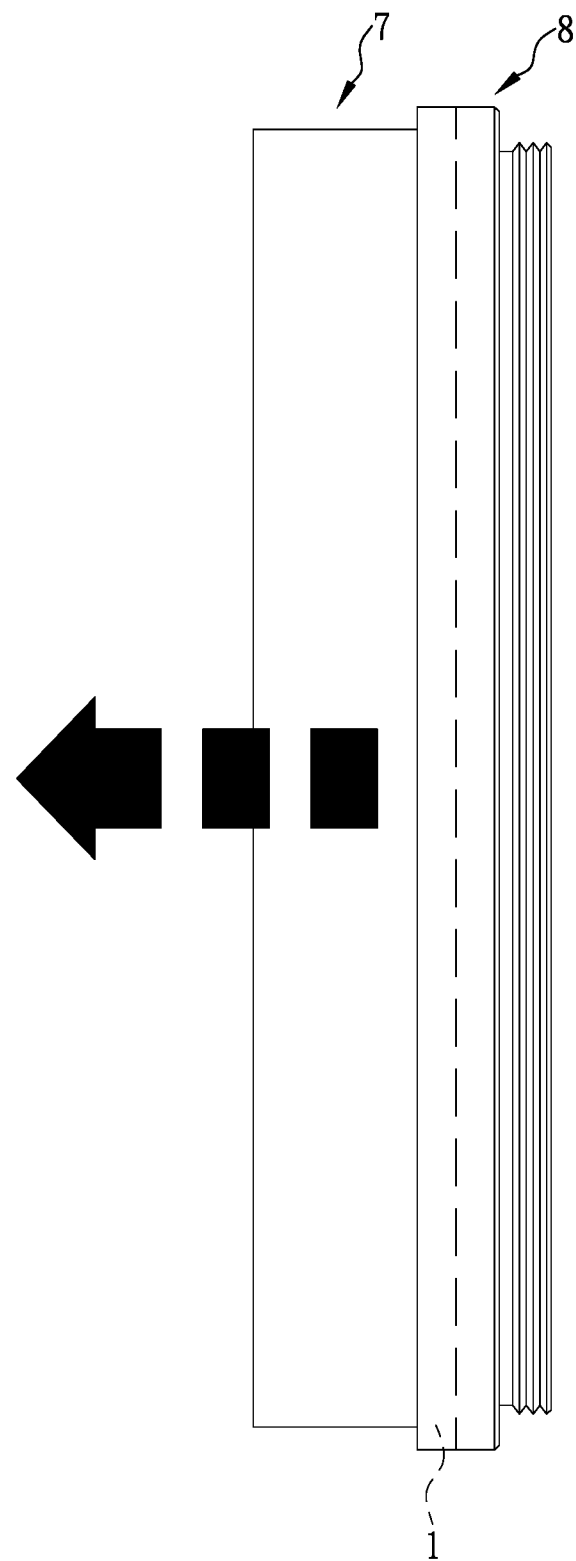
FIG. 11 is an assembled view of an optical device set and a functional lens according to certain embodiments of the present disclosure.

The mounting and dismounting tool 7 includes a magnetic member 71, which is provided with at least one second engaging portion 712 on one side. In certain embodiments, one side of the magnetic member 71 is annularly provided with a plurality of protrusions, such protrusions are separated from each other by an interval, and the interval(s) respectively forms the second engaging portion(s) 712. The second engaging portion(s) 712 can match the first engaging portion(s) 112. When the mounting and dismounting tool 7 is assembled to the optical device 1, each of the second engaging portion(s) 712 can be engaged with the corresponding first insertion portion(s) 112 (as shown in FIG. 10). However, in other embodiments of the present disclosure, the form of the second engaging portion is not limited to the interval form, and its number, disposition position and structural form can be changed according to the form of the first engaging portion. For example, as shown in FIG. 6D, when a first engaging portion 212 is a cavity, a second engaging portion can be adjusted to be a protruding pillar to match the first engaging portion 212, and can be extended into the first engaging portion 212 to drive the frame 21 to rotate.

There are also multiple embodiments for the structure with magnetic characteristics that is required by the magnetic member according to the present disclosure. The magnetic member, in addition to one being entirely made of a magnetic material, in certain embodiments can include a tool main body and a tool auxiliary body. The tool main body is made of a non-magnetic material (e.g., aluminum), and the tool auxiliary body is made of a magnetic material. In other words, when the magnetic member includes both a non-magnetic material and a magnetic material, the magnetic member can be distinguished into a tool main body and a tool auxiliary body, and the tool main body is not limited to a single component, but can also be composed of a plurality of components. Accordingly, the part belonging to the non-magnetic material can be the tool main body, and the part that belongs to the magnetic material can be the tool auxiliary body.

Referring to FIGS. 3 and 4, in certain embodiments, the magnetic member 71 includes a tool main body and a tool auxiliary body 716. The tool auxiliary body 716 is of a magnetic material (e.g., a magnetic column), and the part of the magnetic member 71 that does not belong to the tool auxiliary body 716 is the tool main body. Further, the tool auxiliary body 716 will be embedded in the tool main body, but the magnetic force generated by it is still sufficient to affect the magnetic component(s) outside the tool main body. However, in other embodiments of the present disclosure, the tool auxiliary body 716 can be disposed and exposed on the outer surface of the tool main body, and even be made into each of the second engaging portion(s) 712.

The mode of movement of the mounting and dismounting tool 7 and the optical device 1 is described hereby. It is particularly noted that, regarding the existing structure of a functional lens (such as a neutral-density filter, polarizer, soft focus filter, etc.), camera lens or adapter ring, an internal thread is provided at the inner wall of its front edge. The optical device 1 according to the present disclosure (e.g., as a protective lens, neutral-density filter) is for being fixed to the functional lens, camera lens or adapter ring. The subsequent description will only use the functional lens 8 as an example, but it should be understood that the purpose of the optical device 1 according to the present disclosure also includes being fixed to a camera lens or adapter ring. Referring to FIGS. 3, 4 and 10, before mounting the optical device 1 to the functional element 8, a user can assemble the mounting and dismounting tool 7 to the optical device 1. At this time, each of the second engaging portion(s) 712 and the corresponding first engaging portion(s) 112 are engaged with each other, and the magnetic member 71 will magnetically attract and stick on the frame 11. Accordingly, in the process of the user holding and moving the mounting and dismounting tool 7, the optical device 1 will be moved together, and the user does not need to worry about the optical device 1 being damaged by falling. Afterwards, the user can move the rear side of the optical device 1 to the front side of the function lens 8, and screw it through the external thread 111 to the internal thread 811 of the function lens 8.

Figure 12:
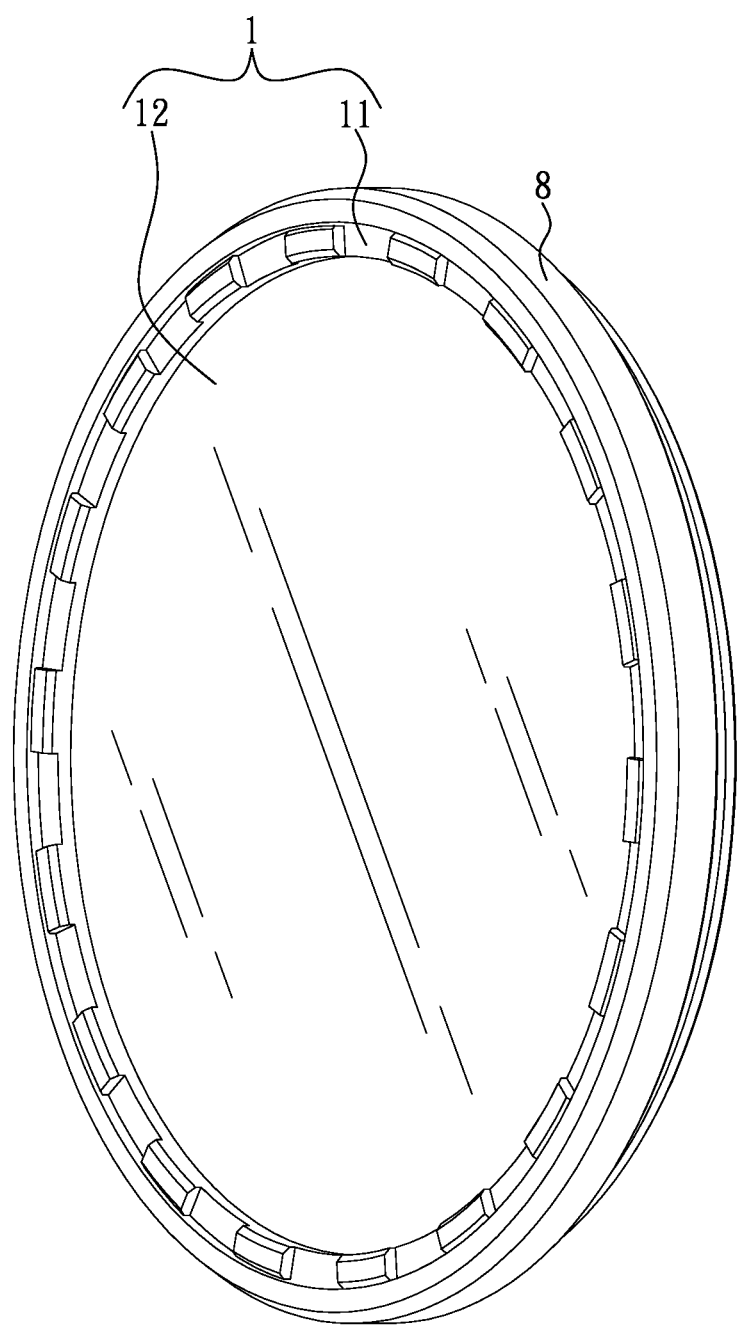
FIG. 12 is an assembled view of an optical device and a mounting and dismounting tool according to certain embodiments of the present disclosure.

Referring to FIGS. 3 and 10 to 12, when the optical device 1 is screwed and fixed to the functional lens 8, since the external thread 111 and the internal thread 811 have been engaged with each other, when a consumer pulls the mounting and dismounting tool 7 outwards (as shown in the direction of the thick dashed arrow in FIG. 11), the magnetic attraction force of the mounting and dismounting tool 7 to the optical device 1 is far less than the engaging force between the external thread 111 and the internal thread 811. Accordingly, the mounting and dismounting tool 7 is disengaged from the optical device 1, leaving the optical device 1 to remain on the functional lens 8 (as shown in FIG. 12). At the same time, the frontmost edge of the front side of the frame 11 does not exceed beyond 2.5 mm from the front side of the functional lens 8. In addition, since the inner wall of the front side of the frame 11 is not provided with a thread, no other components can be mounted thereon, so that the frame 11 can be as light and thin as possible, without needing to reserve space for a thread. In certain preferred embodiments of the present disclosure, the frontmost edge of the front side of the frame 11 does not exceed beyond the front side of the function lens 8 at all. Similarly, the optical device 1 can also be fixed to a camera lens or adapter ring through the aforementioned process. Accordingly, in terms of the functional lens 8, camera lens or adapter ring alone, the optical device 1 is almost embedded in the function lens 8, camera lens or adapter ring, and does not additionally increase the overall length of the functional lens 8, camera lens or adapter ring. Also, the light transmitting sheet 12 will also be close to the function lens 8 or the lens 82 of a camera lens to avoid or reduce the negative impact on camera images (e.g., vignetting).

Further, when the user wants to dismount the optical device 1, referring again to FIGS. 3 and 10-12, the user can also likewise assemble the mounting and dismounting tool 7 to the optical device 1. Each of the second engaging portion(s) 712 will be engaged with the corresponding first engaging portion(s) 112. Afterwards, the user can rotate the mounting and dismounting tool 7, with the rotating direction being the direction that unscrew the external thread 111 from the internal thread 811, until the optical device 1 can be released from the function lens 8. At this time, since there is no engaging force between the external thread 111 and the internal thread 811, the magnetic attraction force of the mounting and dismounting tool 7 to the optical device 1 will cause the optical device 1 to be attracted to and stick on the mounting and dismounting tool 7, facilitating the user to move the optical device 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical device with a magnetic mounting and dismounting mechanism, comprising:
   a frame, having at least a partial region made of a magnetically permeable material or a magnetic material, and having an accommodating space penetrating through front and back, wherein an outer wall of the frame is annularly provided with at least one external thread, and a front side of the frame has at least one first engaging portion; and
   at least one light-transmitting sheet configured to be mounted in the accommodating space to form the optical device,
   wherein the frame is configured to be screwed into a front side of a camera lens, a functional lens or an adapter ring through the external thread and expose the first engaging portion, the first engaging portion is configured to be engaged with at least one second engaging portion of a mounting and dismounting tool so as to be driven by the mounting and dismounting tool to rotate and be dismounted from the camera lens, the functional lens or the adapter ring, and the frame is configured to be magnetically attracted to and stick on the mounting and dismounting tool.

2. The optical device according to claim 1, wherein the front side of the frame does not exceed beyond 2.5 mm from the front side of the camera lens, the functional lens or the adapter ring, and an inner wall of the front side of the frame does not have a thread.

3. The optical device according to claim 2, wherein when in a state where the frame is screwed into an inner side of a front edge of the camera lens, the functional lens or the adapter ring, the front side of the frame does not exceed beyond the front edge of the camera lens, the functional lens or the adapter ring.

4. The optical device according to claim 1, wherein the entire frame is made of a magnetically permeable material.

5. The optical device according to claim 1, wherein the frame comprises a main body and an auxiliary body, the main body is made of a non-magnetically permeable material or a non-magnetic material, and the auxiliary body is made of a magnetically permeable material or a magnetic material, and configured to be disposed on an outer surface of, or embedded in, the main body.

6. The optical device according to claim 1, wherein the frame is composed of a plurality of frame units.

7. The optical device according to claim 1, wherein the light-transmitting sheet is fixed in the frame through an adhesive layer.

8. The optical device according to claim 1, wherein an inner side of the frame has at least one clamping plate, the clamping plate is configured to clamp the light-transmitting sheet so that the light-transmitting sheet is fixed into the frame.

9. The optical device according to claim 1, wherein the frame has a breaching opening, and when the light-transmitting sheet is mounted in the accommodating space, the breaching opening is sealed.

10. The optical device according to claim 9, wherein the breaching opening is obliquely formed, a position of the frame that corresponds to the breaching opening is divided into two ends adjacent to each other, a position of the frame that corresponds to the breaching opening is concavely formed with a fixing groove along a radial direction or an axial direction, the fixing groove penetrates through the two ends, and the fixing groove is configured to be extended, and be fixed, with at least one fixing component to seal the breaching opening.

11. The optical device according to claim 1, further comprising an inner frame disposed between the frame and the light-transmitting sheet.

12. A mounting and dismounting tool with a magnetic mounting and dismounting mechanism for mounting and dismounting an optical device, the mounting and dismounting tool comprising:
   a magnetic member, having at least a partial region made of a magnetic material, and having at least one second engaging portion at a side thereof, wherein the second engaging portion is configured to be engaged with at least one first engaging portion of the optical device, to drive the optical device to rotate and be mounted to a camera lens, a functional lens or an adapter ring, and to drive the optical device to rotate and be dismounted from the camera lens, the functional lens or the adapter ring, and the magnetic member is configured to magnetically attract and stick on the optical device.

13. The mounting and dismounting tool according to claim 12, wherein the entire magnetic member is made of a magnetic material.

14. The mounting and dismounting tool according to claim 12, wherein the magnetic member comprises a tool main body and a tool auxiliary body, the tool main body is made of a non-magnetic material, and the tool auxiliary body is made of a magnetic material, and configured to be disposed on an outer surface of, or embedded in, the tool main body.

15. An optical device set with a magnetic mounting and dismounting mechanism, comprising:
   an optical device, comprising:
      a frame, having at least a partial region made of a magnetically permeable material or a magnetic material, and having an accommodating space penetrating through front and back, wherein an outer wall of the frame is annularly provided with at least one external thread, and a front side of the frame has at least one first engaging portion; and
      at least one light-transmitting sheet configured to be mounted in the accommodating space; and
   a mounting and dismounting tool, comprising:
      a magnetic member, having at least a partial region made of a magnetic material, and having at least one second engaging portion at a side thereof, wherein the magnetic member is configured to magnetically attract and stick on the frame, and the mounting and dismounting tool is configured to:
      drive the optical device to rotate and be mounted to a camera lens, a functional lens or an adapter ring, so that the frame is screwed into a front side of the camera lens, the functional lens or the adapter ring through the external thread and the first engaging portion is exposed; and
      drive the optical device to rotate and be dismounted from the camera lens, the functional lens or the adapter ring.

16. The optical device set according to claim 15, wherein the front side of the frame does not exceed beyond 2.5 mm from the front side of the camera lens, the functional lens or the adapter ring, and an inner wall of the front side of the frame does not have a thread.

17. The optical device set according to claim 16, wherein when in a state where the frame is screwed into an inner side of a front edge of the camera lens, the functional lens or the adapter ring, the front side of the frame does not exceed beyond the front edge of the camera lens, the functional lens or the adapter ring.

18. The optical device set according to claim 15, wherein the entire frame is made of a magnetically permeable material.

19. The optical device set according to claim 15, wherein the frame comprises a main body and an auxiliary body, the main body is made of a non-magnetically permeable material or non-magnetic material, and the auxiliary body is made of a magnetically permeable material or a magnetic material, and configured to be disposed on an outer surface of, or embedded in, the main body.

20. The optical device set according to claim 15, wherein the entire magnetic member is made of a magnetic material.

21. The optical device set according to claim 15, wherein the magnetic member comprises a tool main body and a tool auxiliary body, the tool main body is made of a non-magnetic material, and the tool auxiliary body is made of a magnetic material, and configured to be disposed on an outer surface of, or embedded in, the tool main body.

22. The optical device set according to claim 15, wherein the frame has a breaching opening, and when the light-transmitting sheet is mounted in the accommodating space, the breaching opening is sealed.

23. The optical device set according to claim 22, wherein the breaching opening is obliquely formed so that a position of the frame that corresponds to the breaching opening is divided into two ends adjacent to each other, a position of the frame that corresponds to the breaching opening is concavely formed with at least one fixing groove along a radial direction or an axial direction, the fixing groove penetrates through the two ends, and the fixing groove is configured to be extended, and be fixed, with at least one fixing component to seal the breaching opening.

\* \* \* \* \*